United States Patent [19]

Matsumura

[11] Patent Number: 4,878,172

[45] Date of Patent: Oct. 31, 1989

[54] FOUR-AXIS LATHE NC PROGRAM CREATION METHOD

[75] Inventor: Teruyuki Matsumura, Tokyo, Japan

[73] Assignee: Fanuc Ltd., Minamitsuru, Japan

[21] Appl. No.: 131,192

[22] PCT Filed: Apr. 1, 1987

[86] PCT No.: PCT/JP87/00203

§ 371 Date: Nov. 25, 1987

§ 102(e) Date: Nov. 25, 1987

[87] PCT Pub. No.: WO87/05845

PCT Pub. Date: Oct. 8, 1987

[30] Foreign Application Priority Data

Apr. 1, 1986 [JP] Japan .................................. 61-75301

[51] Int. Cl.$^4$ ............................................ B23Q 15/00
[52] U.S. Cl. ................................ 364/191; 364/474.11;
364/474.23; 364/474.27
[58] Field of Search .................... 364/191, 192, 474.11,
364/474.22, 474.23, 474.24, 474.25, 474.26,
474.27

[56] References Cited

U.S. PATENT DOCUMENTS

| | | | |
|---|---|---|---|
| 4,424,569 | 1/1984 | Imazeki et al. | 364/474.11 |
| 4,558,419 | 12/1985 | Kanematsu et al. | 364/474.11 |
| 4,571,670 | 2/1986 | Kishi et al. | 364/474.11 |
| 4,587,607 | 5/1986 | Kurakake | 364/474.11 |
| 4,590,572 | 5/1986 | Imanishi | 364/474.11 |
| 4,700,313 | 10/1987 | Takagawa | 364/474.27 |

Primary Examiner—Allen MacDonald
Attorney, Agent, or Firm—Staas & Halsey

[57] ABSTRACT

The process names of machining processes to be balance cut are registered in a parameter storage area (13a) in advance. If the name of the balance cutting process registered in the parameter storage area has been inputted in the machining process input step, a conversational frame calling for the tools of the first and second tool rests used in the balance cutting is displayed on a display unit (15) in the next used tool data input step. When there is a request to create first and second NC programs for respectively controlling the first and second tool rests using all of the conversationally inputted data, a processor (11) creates the first NC program for controlling the first tool rest in the order of the inputted machining processes, and inserts an instruction (e.g. a G-function instruction "G68") in front of NC data for executing the balance cutting process, which instruction is for moving its own tool rest in symmetrical fashion in synchronism with the other tool rest. Similarly, the processor (11) creates the second NC program for controlling the second tool rest and inserts "G68" in front of NC data for balance cutting.

6 Claims, 7 Drawing Sheets

FIG.6

| NO. | TYPE OF PROCESS | TOOL REST NO. |
|---|---|---|
| 1 | OUTER DIAMETER ROUGHING | 1,2 |
| 2 | OUTER DIAMETER FINISHING | 1,2 |
| 3 | GROOVING | 1 |
| 4 | THREAD CUTTING | 2 |
| 5 | THREAD CUTTING | 1 |

FIG.7

| NO. | TOOL REST 1 | TOOL REST 2 | ROTATIONAL SPEED |
|---|---|---|---|
| [1] | OUTER DIAMETER ROUGHING | BALANCE CUTTING | G96 V120 M03 (1) |
| 2 | OUTER DIAMETER FINISHING | BALANCE CUTTING | G96 V115 M03 (1) |
| 3 | GROOVING | | G96 V90 M03 (1) |
| 4 | | THREAD CUTTING | G96 V130 M03 (2) |
| 5 | THREAD CUTTING | | G96 V125 M03 (1) |

V =

| DISCON-TINUE | CUTTER 1 UP | CUTTER 1 DOWN | CUTTER 2 UP | CUTTER 2 DOWN | S CODE SELECT | CURSOR BACK | CURSOR AHEAD | | NEXT PAGE |

FOUR-AXIS LATHE NC PROGRAM CREATION METHOD

BACKGROUND OF THE INVENTION

1. Technical Field

This invention relates to a four-axis lathe NC program creation method and, more particularly, to a method of creating NC programs for a four-axis lathe which includes a balance cutting process.

2. Description Art

In controlling the machining of a simultaneous four-axis lathe having first and second tool rests, there are provided first and second NC programs corresponding to respective ones of the tool rests and having queuing commands. While synchronization is achieved by the queuing commands, movement of the corresponding tool rests is controlled independently by the first and second NC programs to subject a workpiece to machining. With a simultaneous four-axis lathe, therefore, machining time can be shortened by e.g. machining the external form of a workpiece by the tool mounted on one tool rest and, at the same time, machining the inner diameter of the workpiece by the tool mounted on the other tool rest.

A four-axis lathe makes cutting referred to as "balance cutting" possible so that elongated, slender workpieces can be subjected to highly precise turning. When an elongated, slender workpiece WK is machined in accordance with this cutting method, as illustrated in FIG. 9, first and second tools TL1, TL2 are brought into contact with the workpiece from both sides thereof and the tools are moved synchronously in symmetric fashion to machine the workpiece simultaneously. Flexing of the workpiece can be prevented to enable highly precise machining, and it is possible to subject the workpiece to a heavy machining operation. In FIG. 9, CHK represents a chuck.

The NC programs for such a four-axis lathe are created automatically in conversational fashion by the automatic programming function of an NC unit or by a separately provided automatic programming unit.

The conventional automatic programming unit, however, does not possess a function for automatically creating an NC program for balance cutting. For this reason, a programming operation for a case where a balance cutting process is included is troublesome.

Accordingly, an object of the present invention is to provide a four-axis lathe NC program creation method through which it is possible to automatically create an NC program which includes NC data for balance cutting.

DISCLOSURE OF THE INVENTION

The present invention provides an NC program creation method which includes displaying conversational frames conforming to respective ones of a plurality of input steps on a display unit, inputting data for specifying finished profile, machining processes and tools used by referring to each conversational frame, and creating first and second NC programs for controlling the first and second tool rests of a four-axis lathe, using the inputted data.

In this NC program creation method, the names of machining processes to be balance cut are registered in advance. If a balance cutting process has been inputted in the machining process input step, a conversational frame calling for the tools of the first and second tool rests used in the balance cutting is displayed, and the tool data are inputted, in the next tool use data input step. When the first and second NC programs are created using all of the conversationally inputted data, an instruction for moving its own tool rest symmetrically in synchronism with the other tool rest is inserted ahead of the NC data which execute the balance cutting process.

BRIEF DESCRIPTION OF THE DRAWINGS

FIGS. 6 and 7 are views for describing process editing frames;

DESCRIPTION OF THE PREFERRED EMBODIMENT

Figure 1:
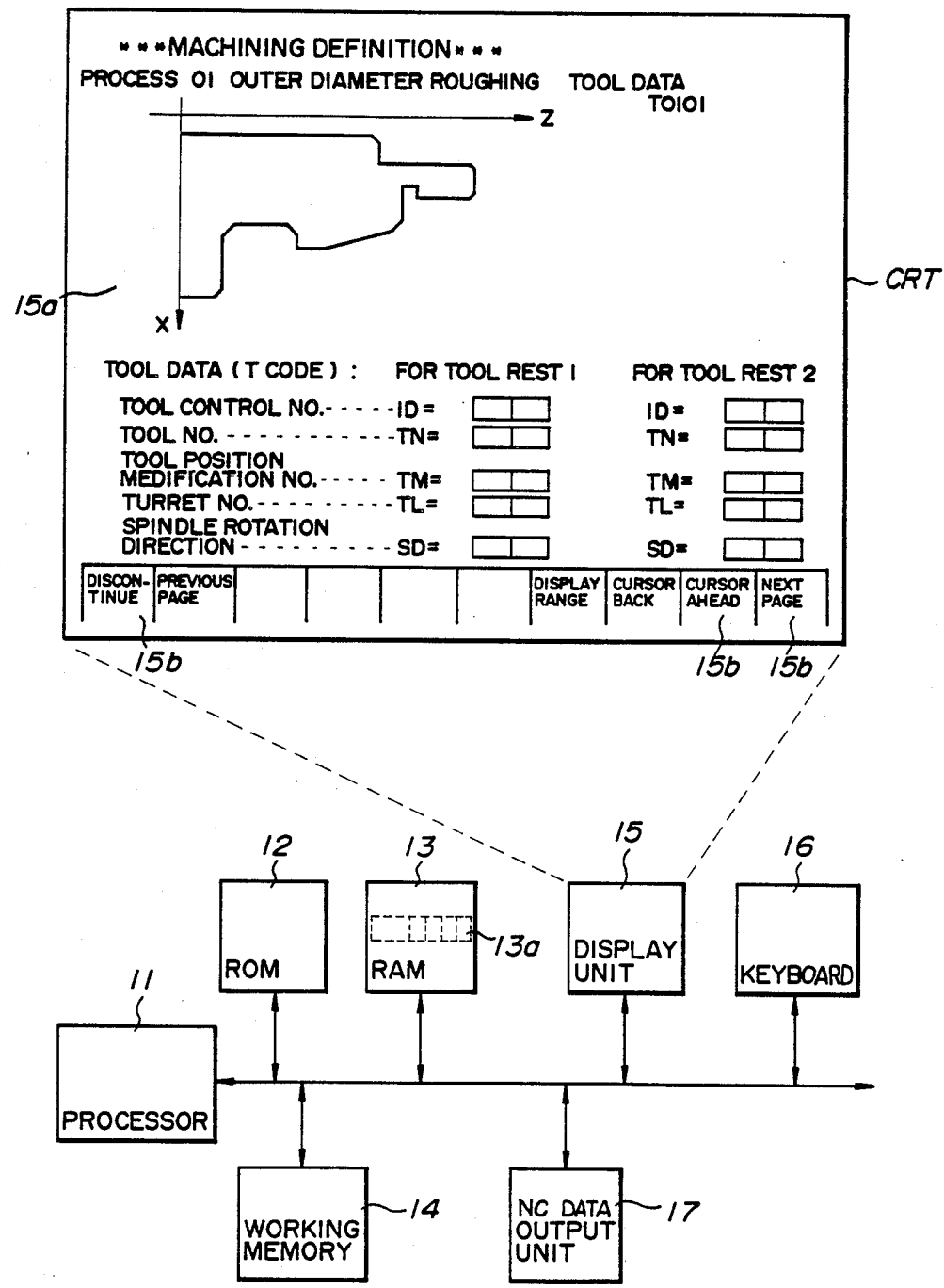
FIG. 1 is a block diagram of an automatic programming apparatus for practicing the invention.

FIG. 1 is a block diagram of an automatic programming unit for practicing the present invention.

Numeral 11 denotes a processor, 12 a ROM, 13 a RAM, 14 a working memory, 15 a display unit (CRT), 16 a keyboard for inputting data, and 17 an NC data output unit for outputting created NC programs to an external storage medium.

The CRT is provided with a conversational frame display region 15a and a plurality of soft key regions 15b. Keys, not shown, are provided, corresponding to the soft key regions. By pressing one of these keys, the data displayed in the corresponding soft key region can be inputted.

The RAM 13 is provided with parameter storage areas 13a for storing a variety of parameters.

Figure 2:
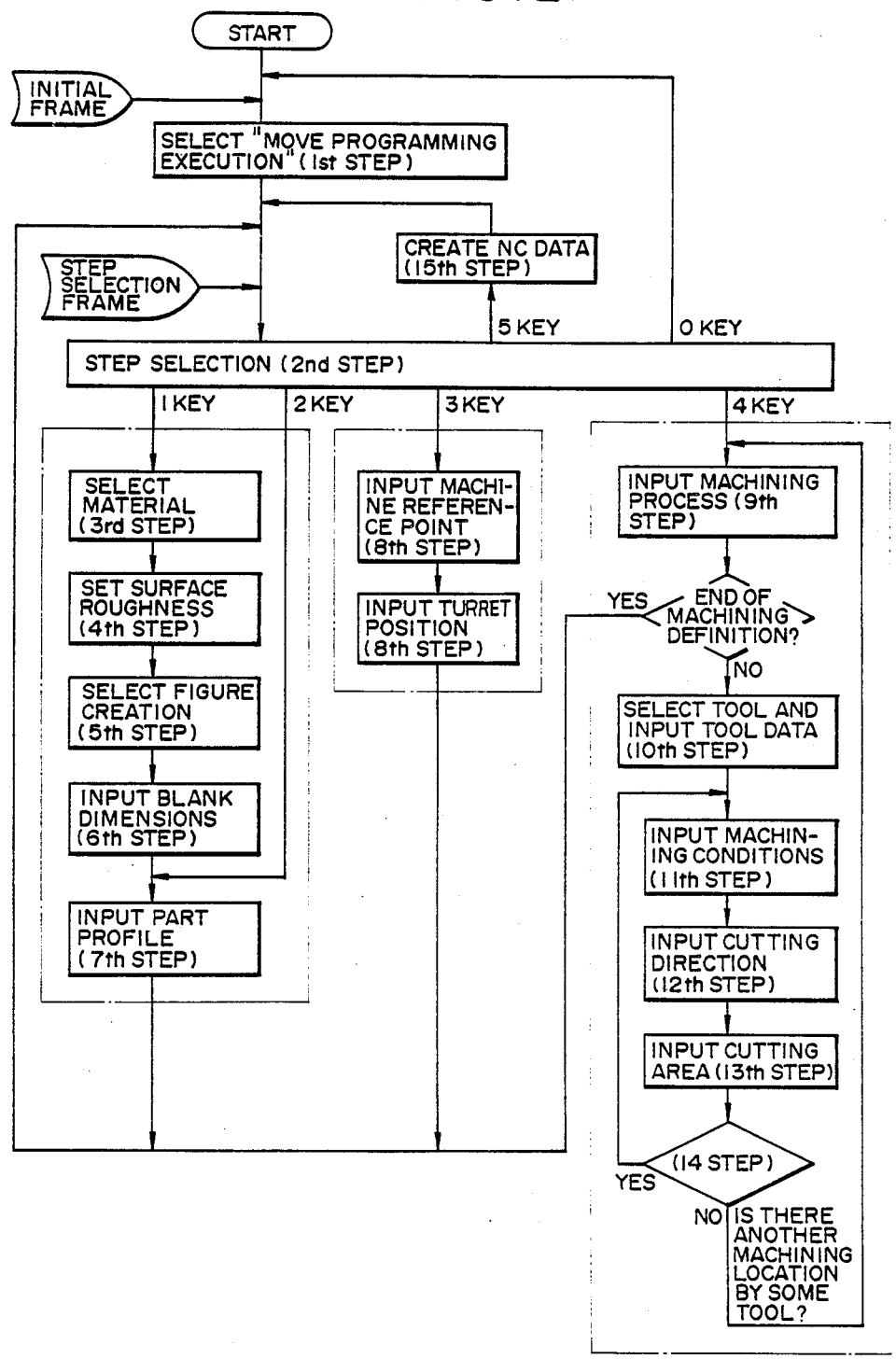
FIG. 2 is a general flowchart of automatic programming processing.

FIG. 2 is a flowchart of automatic programming processing for a four-axis automatic lathe. This automatic programming processing roughly comprises the following 15 steps:

(1) a first step of selecting "automatic programming" execution;

(2) a second step of selecting data to be inputted (i.e. a step of selecting the step to be executed next);

(3) a third step of selecting the material of a blank;

(4) a fourth step of setting surface roughness;

(5) a fifth step of selecting a drawing format;

(6) a sixth step of inputting the blank profile and the dimensions thereof;

(7) a seventh step of inputting the part profile and the dimensions thereof;

(8) an eighth step of inputting a machine reference point and turret position;

(9) a ninth step of selecting a machining process;

(10) a tenth step of selecting a tool and inputting tool data;

(11) an eleventh step of deciding machining conditions;

(12) a twelfth step of inputting cutting direction;

(13) a thirteenth step of inputting cutting range;
(14) a fourteenth step of inputting whether or not a region is cut by the same tool; and
(15) a fifteenth step of calculating a tool path (i.e. a step of creating NC data).

The programming apparatus shown in FIG. 1 successively displays predetermined inquiry images (conversational frames) on the display screen of display unit 15. In response to the inquiries, the operator inputs the required data from the keyboard 16 and the programming apparatus eventually creates the first and second NC programs for the four-axis lathe by using all of the inputted data. It should be noted that the flowchart of FIG. 2 can also be applied to a two-axis lathe. For the details, refer to U.S. Ser. No. 767,264, entitled "Machining Process Determination Method in Automatic Programming".

Figure 3:
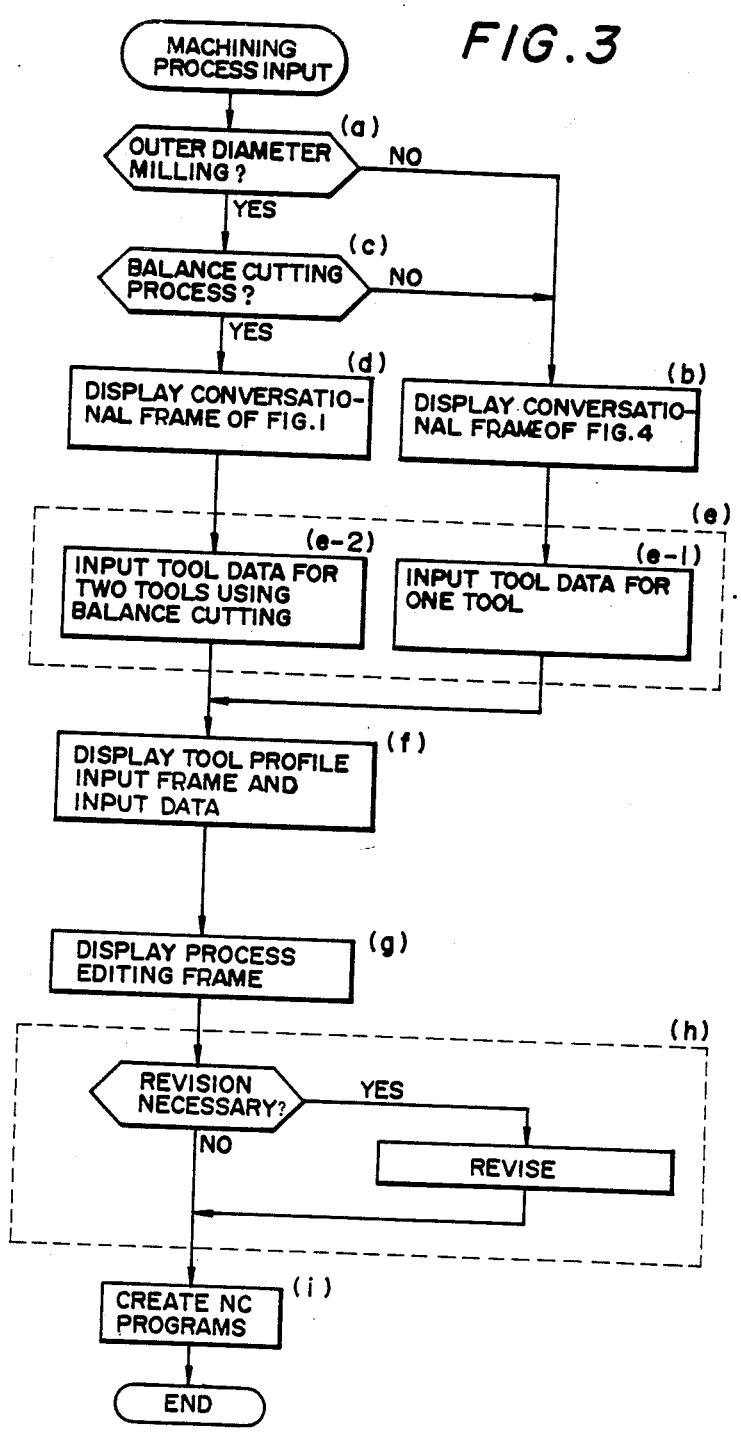
FIG. 3 is a flowchart of processing for NC program creation in accordance with the invention.

FIG. 3 is a flowchart of processing indicative of the method of the invention for a case where a balance cutting process is included as a machining process. A data input method and an NC data creation method for a case where a balance cutting process is included will now be described. It should be noted that a process for which balance cutting is possible is limited to outer-diameter turning (outer diameter roughing, outer diameter intermediate finishing and outer diameter finishing) and that the name of the balance cutting process is stored beforehand in the parameter storage region 13a of RAM 13 (FIG. 1). In actuality, whether outer diameter roughing, outer diameter intermediate finishing or outer diameter finishing is to be performed by balance cutting is specified by the "1", "0" states of first, second and third bits of a predetermined parameter. For example, if the first bit is "1", the automatic programming unit recognizes this as meaning that balance cutting is to be applied to outer diameter roughing; if the second bit is "1", the automatic programming unit recognizes this as meaning that balance cutting is to be applied to outer diameter intermediate finishing; if the third bit is "1", the automatic programming unit recognizes this as meaning that balance cutting is to be applied to outer diameter finishing.

(a) When a machining process is inputted in the ninth step of FIG. 2, the processor 11 checks whether the inputted machining process is outer diameter turning (outer diameter roughing, outer diameter intermediate finishing, outer diameter finishin9).

(b) If the machining process is not outer diameter turning, the CRT is caused to display a conversational frame (see FIG. 4) for inputting data which specify a tool (one type) used in the machining process inputted in the ninth step (e.g. end face roughing).

(c) If the inputted process is any one of outer diameter roughing, outer diameter intermediate finishing and outer diameter finishing, the processor 11 refers to the parameter stored in the parameter storage area 13a and checks whether this process is the balance cutting process.

(d) If the process is not the balance cutting process, then the program jumps to step (b). If the process is the balance cutting process (e.g. outer diameter roughing), then the display screen CRT is made to display a conversational frame (see FIG. 1) calling for two types of tools for the first and second tool rests used in the balance cutting.

(e) If the process is not the balance cutting process, the operator inputs the (i) tool management number ID, (ii) tool number TN, (iii) tool position modification number TM and (iv) turret number TL for one type of tool at step (e-1).

If the process is the balance cutting process, the operator inputs at step (e-2) the (i) tool management numbers ID, (ii) tool numbers TN, (iii) tool position modification numbers TM, (iv) turret numbers TL and (v) spindle rotation directions SD for the first and second tools used in balance cutting. Note that if the tool numbers, tool position modification numbers, turret numbers and tool shapes, etc. are stored in the RAM 13 as a tooling file in correspondence with the tool management numbers, merely inputting a tool management number will cause the other data to be displayed automatically on the CRT.

Further, it should be noted that the balance cutting process will not be established if only the tool data for one tool are inputted in the conversational frame of FIG. 1, and processing proceeds to the next step while leaving the other tool data undefined.

Moreover, the turret numbers of the first and second tools cannot be made the same value, and the spindle rotation directions of the first and second tools must be identical. Processing cannot proceed to the next step if the turret numbers are the same or the spindle directions are different.

If a tool is specified for only one of the tool rests in the case of balance cutting, the processor 11 will not put the balance cutting process into effect.

Figure 4:
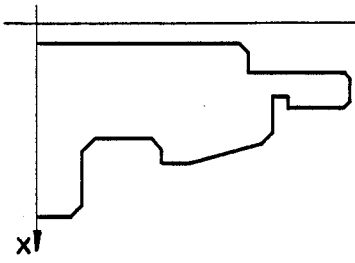
FIG. 4 shows an example of a conversational frame for tool data input.
Figure 5:
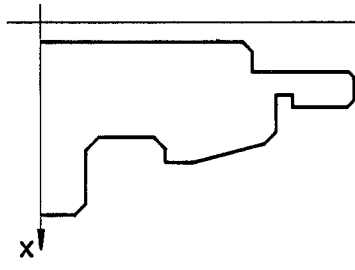
FIG. 5 shows an example of a conversational frame for tool shape data input.

(f) When the prescribed tool data have been inputted in FIGS. 1 or 4, the conversational frame for inputting the tool shape shown in FIG. 5 is displayed. Accordingly, tool shape data are inputted successively in response to the displayed prompts.

In a case where a tooling file has been stored in RAM 13, a frame which includes the tool shape data is displayed automatically.

Processing cannot proceed to the next step if the first and second tool shapes [tool nose radius (RN), cutter angle (AC) and tool nose angle (AN)] differ when balance cutting is in effect.

(g) Thereafter, all the necessary data are inputted conversationally and the numerical value 5 key is pressed in the second step (see FIG. 2) to request the creation of first and second NC programs which control the first and second tool rests, whereupon the processor 11 causes the tool editing frame to be displayed on the CRT.

By way of example, if outer diameter roughing and outer diameter finishing are both registered as balance cutting processes and processes are defined as shown in FIG. 6 by "Machining Definition" from the ninth step (see FIG. 2) onward, then a process editing frame in which processes are allotted to each tool rest will be displayed as shown in FIG. 7. In other words, if outer diameter roughing and outer diameter finishing are registered for balance cutting, outer diameter roughing is specified as a first machining process, outer diameter finishing as a second machining process, grooving as a third machining process and thread cutting as fourth and fifth processes, the tools of the first and second tool rests are specified as the tools used in the first and second machining processes, the tool of the first tool rest is registered as the tool used in the third and fifth machining processes and the tool of the second tool rest is specified as the tool used in the fourth machining process, then a process editing frame in which the machining processes are arranged according to tool rest will be displayed, as shown in FIG. 7.

In FIG. 7, G96 is a G-function instruction which commands constant peripheral speed control, the alphabetic character V is a word address which commands cutting velocity, and M03 is an M-function instruction which commands forward spindle rotation. The numeral i (=1, 2) within the parentheses on the right side means that the instruction (G96 S . . . ) which specifies spindle rotational speed is outputted to the i-th NC program.

(h) The operator can revise the cutting velocity V and the sequence of processes for each tool rest when the process editing frame is being displayed. If revision is necessary, therefore, a predetermined revision operation is performed; if not, processing proceeds to the next step.

In a case where it is desired to revise the cutting velocity V of a prescribed process, a cursor CSR is positioned at the prescribed process by pressing cursor ahead/back keys, after which the cutting velocity may be inputted from the keyboard.

In order to revise "THREAD CUTTING" of the fifth process for tool rest 1 in such a manner that the machining is performed at the same time as "THREAD CUTTING" performed by the tool rest 2, it will suffice to position the cursor CSR at the fifth process and then press the soft key "CUTTER 1 UP" (or to position the cursor at the fourth process and presses the soft key "CUTTER 2 UP").

(i) If revision is unnecessary or the creation of an NC program is requested after a revision operation is completed, the processor 11 creates the first and second programs of the tool rests 1 and 2.

Figure 8:
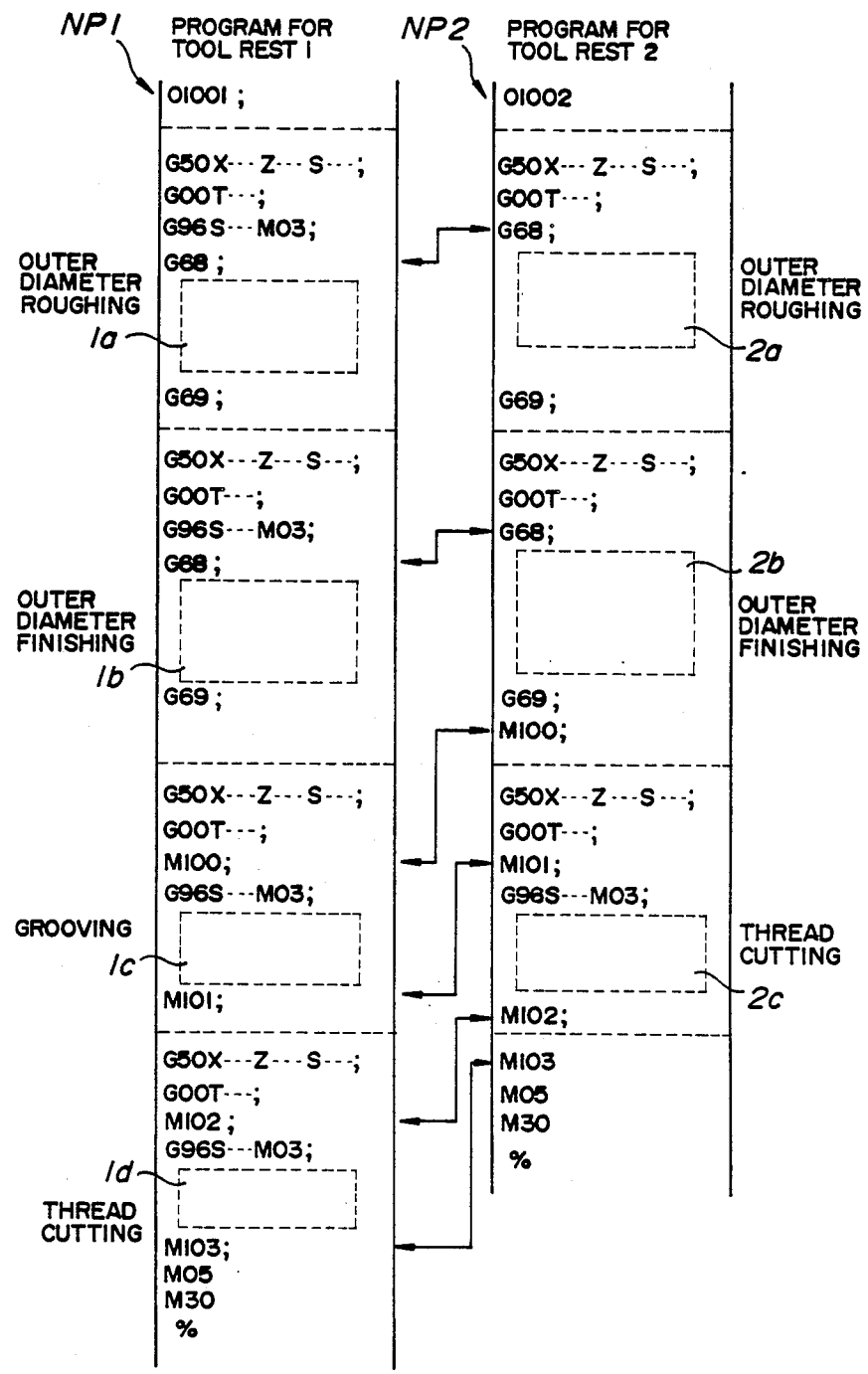
FIG. 8 is a view for describing first and second NC programs of a four-axis simultaneous lathe which includes a balance cutting process.
Figure 9:
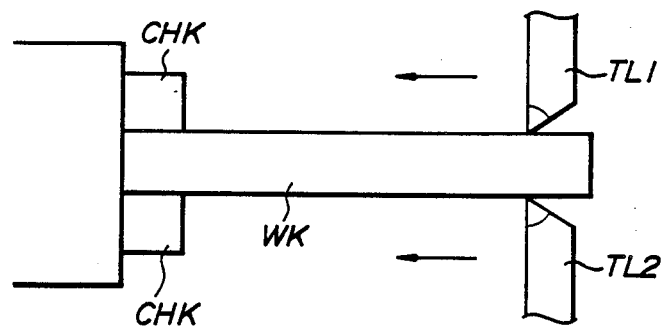
FIG. 9 is a view for describing balance cutting.

FIG. 8 is a view for describing the configuration of first and second NC programs NP1, NP2 in a case where machining is executed in the process sequences shown in FIG. 7.

In the first NC program NP1, 1a is an NC data section for specifying a tool path for outer diameter roughing, which is the first machining process of tool rest 1;

1b is an NC data section for specifying a tool path for outer diameter finishing, which is the second machining process of tool rest 1;

1c is an NC data section for specifying a tool path for grooving, which is the third machining process of tool rest 1; and 1d is an NC data section for specifying a tool path for thread cutting, which is the fourth machining process of tool rest 1.

In the second NC program NP2, 2a is an NC data section for specifying a tool path for balance cutting (outer diameter roughing) which is the first machining process of tool rest 1;

2b is an NC data section for specifying a tool path for balance cutting (outer diameter finishing) which is the first machining process of tool rest 2; and 2c is an NC data section for specifying a tool path for thread cutting, which is the third machining process, of tool rest 2.

The tool path of each process is automatically decided using the finished profile, cutting conditions, etc., whereupon the NC data sections 1a-1d, 2a-2c are created.

In the first and second NC programs NP1, NP2,

"01001", "01002" at the beginning are program numbers;

"G50 X..Z.. " are NC data for a coordinate system setting specified on the basis of machine reference point and turret swivel position inputted at the eighth step of FIG. 2;

"G00" in "G00 T.." is a G-function instruction indicating that subsequent path data are for positioning until G01–G03 are commanded, and "T.." represents NC data for tool selection specified by the tool data inputted at the tenth step;

"G96 S..M03" represents NC data for specifying spindle rotation;

"G68" represents a G-function instruction indicating that a subsequent cutting process is a balance cutting process ("balance cutting mode"; and "G69" represents a G-function instruction for cancelling the balance cutting mode. When "G68" is commanded in one of the NC programs in actual NC machining, pulse distribution is halted until "G68" is commanded by the other NC program. At the moment "G68" is commanded in this other NC program, the pulse distributions in the cutting feeds for both tool rests are started synchronously, whereby both tool rests are moved symmetrically at exactly the same time to make balance cutting possible. In the example of FIG. 7, therefore, the NC data sections 1a, 2a are executed simultaneously, and so are the NC data sections 1b, 2b.

"M100"–"M103" are M-function instructions for queuing. For example, when "M100" is commanded from one NC program, control in accordance with this program is halted until "M100" is commanded from the other program.

When creation of NC programs has been requested, the processor 11 (FIG. 1) creates the first NC program for controlling the first tool rest in the order of the machining processes using the finished profile, cutting condition and tool data, inserts "G68" indicative of the balance cutting mode in front of the NC data for executing the balance cutting process, and inserts "G69" indicative of balance cutting mode cancellation after the abovementioned NC data. In a similar manner, the processor 11 subsequently creates the second NC program for controlling the second tool rest, inserts "G68", "G69" before and after the NC data section for balance cutting, and then ends the processing for NC program creation.

Thus, the present invention is effective in that first and second NC programs for a simultaneous four-axis lathe can be created automatically even in cases where a balance cutting process is included.

Further, in accordance with the invention, the name of a process to be balance cut is requested in advance, and whether or not the requested process name has been inputted in a process definition step is discriminated. If the process name has been inputted, a conversational picture for inputting data necessary for the creation of balance cutting NC data is displayed and the necessary data are inputted. This makes it possible to input the data in a simple manner without taking into consideration whether a process is to be balance cut or not.

I claim:

1. A numerical control program creation method for a four-axis lathe, having first and second tool rests, comprising the steps of:

(a) displaying conversational frames corresponding to a plurality of input steps on a display unit;

(b) inputting data in the conversational frames, for specifying a finished profile, machining processes and tools used;

(c) creating first and second numerical control programs for controlling the first and second tool rests of the four-axis lathe, using the data input in step (b);

(d) previously inputting and storing in memory a name of a balance cutting machining process;

(e) checking whether the machining process to be balanced cut has been inputted in step (b);

(f) displaying a balance cut conversational frame, calling for tool data for both the first and second tool rests when the name of the machining process to be balance cut is input; and (g) inserting an execution control instruction in front of numerical control data created in step (c) for the balance cutting machining process, the execution control instruction controlling movement of one of the tool rests in symmetrical fachion in synchronism with the other of the tool rests.

2. A numerical control program creation method for a four-zxis lathe according to claim 1,
wherein step (b) comprises inputting an indication of which of the tool rests is to be used for mounting one of the tools in an accociated one of the machining processes, and
wherein step (c) comprises:
(ci) arranging the machining processes in an order specified according to each of the tool rests; and
(cii) creating the first and second numerical control programs in the order of the machining processes.

3. A numercial control program creation method for a four-axis lathe according to claim 1, further comprising the step of (h) inserting a balance cutting cancellation instruction after the numerical control data for each balance cutting process.

4. A numerical control program creation method for a four-axis lathe according to claim 1, wherein step (e) comprises the step of preventing continued program creation when specified tool shapes of balance cutting tools assigned to the tool rests differ in the tool data input in step (b).

5. A numerical control program creation method for a four-axis lathe according to claim 1, further comprising the step of (h) preventing execution of step (g) if only one of the tool rests has the tool data specified in step (b) for the balance cut conversational frame.

6. A numerical control program creation method, comprising the steps of:
(a) storing identification for a balance cut machining process;
(b) receiving data in a conversational data input process to specify machining processes and tools used;
(c) comparing the machining processes input in step (b) with the identification of the balance cut machining process;
(d) displaying a balance cut conversational frame for use in step (b) to input tool data for at least two tool rests when step (c) detects input of the identification for the balance cut machining process; and
(e) creating numerical control programs, each of the numerical control programs controlling one of the at least two tool rests, said creating including inserting an execution control instruction ahead of numerical control data for the balance cut machining process, the execution control instruction controlling movement of one of the tool rests in synchronism with another of the tool rests.

* * * * *

UNITED STATES PATENT AND TRADEMARK OFFICE
CERTIFICATE OF CORRECTION

PATENT NO. : 4,878,172

DATED : October 31, 1989

INVENTOR(S) : Matsumura

It is certified that error appears in the above-identified patent and that said Letters Patent is hereby corrected as shown below:

Col. 3, line 47, "finishin9" should be --finishing--.

Col. 5, line 58, "first" should be --second--.

Col. 7, line 11, "balanced" should be --balance--;

line 23, "zxis" should be --axis--.

Signed and Sealed this

Fourth Day of September, 1990

Attest:

HARRY F. MANBECK, JR.

Attesting Officer

Commissioner of Patents and Trademarks